INVENTORS: W. F. KANNENBERG
J. P. KINZER
C. W. SCHRAMM
I. G. WILSON

BY E. V. Griggs
ATTORNEY

Jan. 9, 1951 W. F. KANNENBERG ET AL 2,537,139
OBJECT LOCATOR SYSTEM
Filed July 14, 1944 2 Sheets-Sheet 2

INVENTORS: W. F. KANNENBERG
J. P. KINZER
C. W. SCHRAMM
I. G. WILSON

BY E. V. Griggs
ATTORNEY

Patented Jan. 9, 1951

2,537,139

UNITED STATES PATENT OFFICE 2,537,139

OBJECT LOCATOR SYSTEM

Walter F. Kannenberg, Lyndhurst, John P. Kinzer, Ridgefield, and Charles W. Schramm, Nutley, N. J., and Ira G. Wilson, New York, N. Y., assignors to Bell Telephone Laboratories, Incorporated, New York, N. Y., a corporation of New York Application July 14, 1944, Serial No. 544,990

3 Claims. (Cl. 178—44)

This invention relates to apparatus and systems for testing object locators of the type in which the position and distance of a remote object are ascertained from the echo interval of reflected electromagnetic waves.

Object locators employing electromagnetic waves commonly transmit pulses of high frequency waves, for example, pulses of the order of a microsecond in length comprising waves of the order of 10-centimeter wavelength. At the termination of each transmitted pulse, a sensitive radio receiver which was disabled or the sensitivity of which was reduced during transmission of a pulse is again placed in sensitive receiving condition. A cathode ray oscillograph associated with the radio receiver serves to delineate a time graph showing the instant of termination of the transmitted pulse and the instant of reception of the energy reflected back from the remote object and detected by the receiver. The cathode ray oscillograph is usually provided with a scale to give a direct measure of the echo interval and it may be calibrated to show the distance to the reflected object in miles or yards.

Many factors determine the effectiveness of such an object locator system. Among these are coincidence of tuning between the transmitter and the radio receiver. At wavelengths such as indicated and with object locating apparatus simple and compact enough for mounting in aircraft, it is quite possible for the transmitter and receiver to get out of tuning alignment in consequence of the violent changes which occur in temperature and other characteristics of the ambient atmosphere. If the detecting element of the receiver or any other component of the receiver or of the transmitter should deteriorate in performance the over-all effectiveness of the system will diminish. In some systems in which the object locator antenna is caused to scan an azimuth or an area in order to give indications of the conditions in many directions there may be a failure of the scanning apparatus which escapes attention thus causing the locator to fail to indicate the presence of reflecting bodies.

An object of the invention is to provide a system which will automatically check the over-all performance of the object locator and manifest it in such a way as to give evidence of such failures.

Another object of the invention is to enable the receiver of an object locator to be readily tuned to the transmitter.

For the purpose of enabling the receiver of an object locator to be tuned to its associated transmitter there has been previously proposed what may be termed a reradiating chamber resonator. Such a reradiating resonator is provided with a small pick-up antenna to lead energy into the resonance chamber during emission of a pulse from the transmitter of the object locator. As long as the impulse persists the resonance chamber absorbs energy and builds up an internal electromagnetic field, the final intensity of which depends upon a number of factors including intensity of the transmitted pulse and the agreement in frequency between the natural resonance of the chamber and the frequency of the transmitted electromagnetic waves. As soon as the impulse ceases the energy stored in the resonance chamber is retransmitted from the chamber and reradiated out over the pick-up antenna to reach the radio receiver in the same manner as an echo from a reflecting body except that there is no echo interval. As long as the chamber continues to give out sufficient energy to override the receiver noise the significant indication at the cathode ray oscillograph of the receiver persists. In the parlance of this art and from analogy to the operation of bells and tuning forks the resonance chamber is said to "ring" and the interval measured from the cessation of the transmitted impulse up to the instant that the electrical echo received at the receiver is, in effect, overridden and obliterated on the cathode ray oscillograph indication by the receiver noise is known as the "ring time" of the reradiating resonance chamber. Since the intensity of the originally transmitted impulse, the resonance frequency of the reradiating chamber, the Q or resonance persistence of the chamber, the tuning of the receiver and the sensitivity of the detector all are factors in the end result, the "ring time" of such a test system is an excellent index of the over-all effectiveness of the object locator or radar system test.

The intervals involved in the operation of such a reradiating chamber test system are brief and the selectivity of the chamber and of the radio receiver is high. It is, therefore, no easy matter to ascertain in what direction changes must be made to bring the various devices into tuning agreement.

An object of this invention is to make the nature of the necessary corrections readily apparent.

Conditions may change quickly thus requiring a readjustment of tuning perhaps during flight of an airplane on which the test apparatus is located. Another object is to enable the necessary determinations to be made with simple apparatus requiring a minimum of time.

It is, of course, most important to be able to know when the various elements have been adjusted to the point of maximum effectiveness of the system and to know how the effectiveness of the apparatus, when so adjusted, compares with the maximum performance of which it has been shown to be capable. An additional object of the invention is to indicate when correct frequency alignment has been attained and to enable the over-all effectiveness of the object locator to be quickly measured.

In accordance with the invention, the resonance frequency of the reradiating chamber is varied cyclically and continuously by a motor which causes the resonance frequency to sweep over a given frequency range, which includes the frequency of the transmitter, at perhaps six to thirty times per second. During each of these cycles a transmitter of the object locator emits a number of pulses or wave trains of high frequency waves. The reradiating chamber stores up energy during the pulse and upon termination of the pulse reradiates some of its oscillation energy back to the receiver so that the cathode ray oscillograph device connected to the receiver of the object locator gives a corresponding reflected pulse indication which varies in magnitude with the "ring time" of the reradiating chamber. It is apparent that the transmitter frequency will lie in the region near the reflected pulse showing the highest "ring time" indication and, in general, between the highest two such indications. The reradiating chamber is also provided with manual means to permit adjustment of its midsweep frequency to be made during operation of the motor driven tuner. It is accordingly possible to ascertain in what part of the cyclically traversed tuning range of the reradiating chamber the frequency of the transmitter falls and to make the requisite tuning corrections to align the tuning of the transmitter and the reradiating chamber. After the reradiating chamber and the transmitter are in frequency agreement the various other components of the radar system may be adjusted one by one to secure a final maximum overall performance as indicated by the ring time indication on the cathode ray oscillograph screen.

Finally, in order to avoid any distortion of the normal field of the transmitter which might tend to give an erroneous indication from the reflected energy, it is desirable to provide arrangements which will minimize the field distorting tendency of the resonant cavity apparatus and its pick-up at times when the transmitter is not being tested.

It is another object of the invention to effectively disconnect at will the pick-up from the resonant cavity so that the pick-up will not present a load or energy-absorbing characteristic to the transmitter field.

Figure 1:
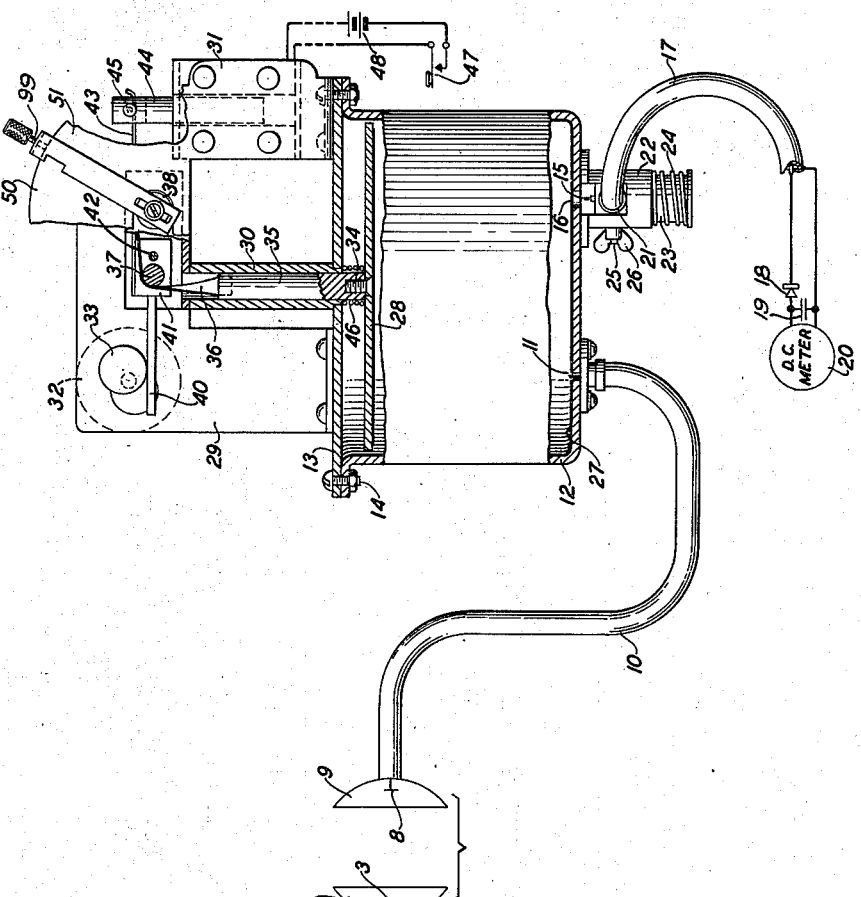
Fig. 1 illustrates schematically an object locator test system in accordance with an embodiment of the invention.
Figure 1:
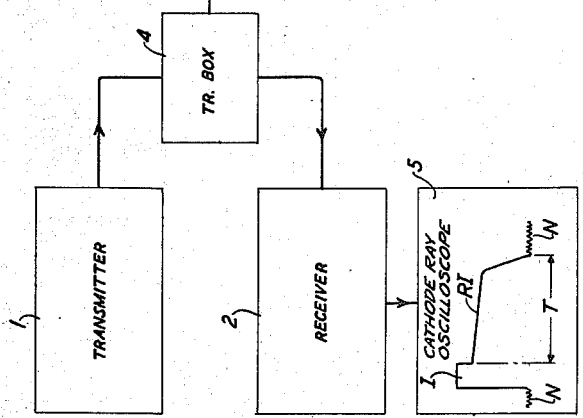
Figure 2:
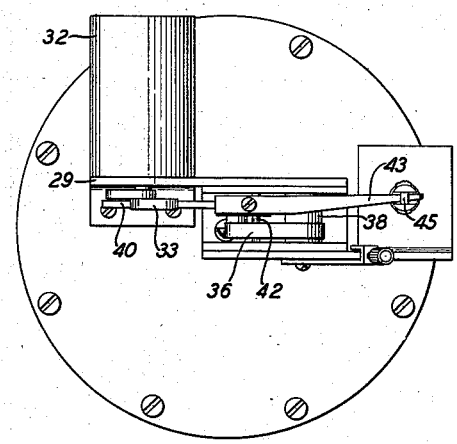
Fig. 2 is a top plan view of the motor-tuned electrical resonance chamber of Fig. 1.

Referring to Fig. 1 there is shown schematically an object locator of the type which transmits pulses of electromagnetic waves and measures the time interval thereafter before receipt of the reflected pulses arriving from a remote reflecting object. The object locator comprises a radio transmitter 1 and a radio receiver 2 connected to a radiating element 3 through an apparatus 4 commonly known as a TR box. Associated with the radio receiver is a cathode ray oscilloscope 5.

The transmitter may be of any well-known type as, for example, a magnetron capable of transmitting high power pulses of high frequency electrical oscillations. In a practical apparatus the peak power of the transmitted pulse may be of the order of 25 to 50 kilowatts. The pulse may be of the order of a microsecond in length and the oscillation wavelength may be of the order of one-half centimeter to 30 centimeters. These magnitudes are not given in any sense as limitations but merely as examples of practical values which may be employed.

The TR box may be of the type disclosed in application Serial No. 474,122, filed by A. L. Samuel, January 30, 1943, relating to transmitting and receiving circuits for Wave Transmission Systems. The TR box connections may comprise a wave guide connected between the transmitter and the receiver on the one hand and the radiator 3 on the other, so as normally to provide a ready path for incoming electromagnetic waves from the radiator 3 to the receiver 2. When the transmitter 1 impresses high power oscillations upon the TR box 4, an electrical discharge device therewithin breaks down placing such very low impedance across the input to the receiver 2 as to effectively desensitize the receiver. The oscillation energy is, accordingly, impressed upon the radiator 3 and is transmitted out therefrom into space in a direction sharply defined by the polarization of the radiator 3 and the configuration of the surrounding parabolic reflector 6. Upon cessation of the impulse, the TR box returns to its normal condition and restores the sensitivity of receiver 2 so that at the time that the outgoing impulse has travelled to the reflecting object and the reflected impulse has arrived at the radiator 3, the receiver will be in condition to receive and indicate it.

The cathode ray oscilloscope may be of well-known type in which the indication is portrayed in the form of a trace, the vertical coordinate of which is proportional to the intensity and the horizontal coordinate of which represents elapsed time as measured by a "sweep circuit" in well-known manner. There is shown on the cathode ray oscilloscope a typical diagram in which the ripple portions marked "N" represent noise fluctuations in the absence of substantial signal. "I" represents the transmitter impulse and the portion "RI" extending over the time duration designated as "T" represents the reflected impulse. This graph will be discussed more fully following the disclosure of the test equipment.

The effectiveness of an object locator equipment of the type schematically represented by elements 1 to 5 inclusive, is, in large measure, dependent upon the skill of the operator in keeping his set in tune and on his early recognition of trouble. Particularly is this true of ship-search apparatus or air-borne apparatus operating over water. In such cases, the screen of the cathode ray oscillograph is sometimes blank for long periods. The spotting of a real target at intervals gives an opportunity for retuning and if it be a distant target provides some measure of the range capabilities of the object locator. In the absence of real targets assurance is lacking that effective searching is being done. Under actual field conditions the object locator is generally not energized until the plane is in the air and sometimes it remains unenergized for as long as twenty minutes or more after a take-off. By this time no targets may be available and what is more important, even if the transmitter and receiver were originally in tune on the ground they may drift apart as they heat up unless held in control by automatic frequency control. Without targets the operator cannot know whether or not this has occurred. Hence unless he has a target available his chance that the receiver will stay in tune with the transmitter over a long trip is doubtful whether he tries to retune or not. Sometimes the sea, itself, can be used as a reflector for tuning but it is not always satisfactory.

Another field condition occurs in retuning the receiver to pick up a beacon target which may happen to be available and then trying to return to the original searching tuning point. It should, of course, be unnecessary to change the receiver setting for the two conditions if it has been accurately enough made and if no changes in the environment have taken place but in the field the necessary adjustments of the object locator cannot always be made accurately enough so that this is possible. It will be apparent, therefore, that it is highly desirable to have a dependable target or reflector which may be fully under the control of the observer at the object locator. Such a device may take the form of an electrical resonance chamber carried along with the object locator equipment to absorb energy during pulses and to return it as a simulated reflected pulse after cessation of the original pulse. It is to improvements in such a phantom target and in the test system employing it that the present invention is directed.

The test equipment for picking up energy of the object locating pulse, storing it and returning some of the energy after the cessation of the pulse to the object locator receiving equipment may comprise an energy pick-up device such as the dipole 8 placed at the focus of parabolic reflector 9 and connected by the coaxial transmission line 10 to a coupling element 11 projecting through an aperture in the lower wall of an electrical resonance chamber 12 into the interior electromagnetic field space of the chamber. The coupler 11 may comprise a small loop, the terminals of which are connected between the central and the outer conductors of the coaxial pair with the loop projecting slightly within the interior space of the chamber. The resonance chamber 12 comprises a cylindrical cup-shaped body portion having a tightly fitting cover 13 bolted thereto as at 14. Also coupled to the electrical resonance chamber through a normally retracted coupler 15 aligned with an aperture 16 in the bottom of the chamber is a coaxial output circuit 17 connected through a series rectifier 18 with a shunt condenser 19 and a microammeter 20. The coupling loop 15 and the end of the coaxial line 17 to which it is connected are mounted with a connector terminal block 21 slidably mounted in a vertical guideway within the frame 22 attached to the lower external surface of chamber 12. The connector block 21 is provided with a cylindrical extension 23 and a retractile spring 24 surrounding the cylindrical extension and reacting between a flanged head thereon and the frame 22 to draw the connector block 21 into a downward position thus retracting the coupler 15 from the interior space of the resonance chamber 12. Connector block 21 carries a laterally projecting threaded stud 25 which extends through a slot in the frame 22 and carries a wing nut 26 to enable it to be clamped thus holding the connector block 21 and the coupler 15 in any desired position. It is, accordingly, possible by freeing wing nut 26 to permit the spring 24 to retract the coupler or, if desired, the cylindrical extension 23 may be pushed upwardly against the action of the spring to carry the coupler 15 into the cavity whereupon wing nut 26 may be employed to lock the terminal block in that position. In order to cause the resonance frequency of the chamber 12 to be varied cyclically over a desired range the chamber is provided with an interior piston-like disc 28 near its upper end. The piston is supported and is caused to reciprocate in a vertical direction by means of a mechanism mounted on the cover frame 13 including an upstanding frame 29, a hollow cylindrical guide 30 and a vertically-disposed electrical solenoid 31, each rigidly attached to the cover. Mounted on the back of frame member 29 with its driving shaft projecting therethrough in a horizontal direction, is a small electrical motor 32 normally operating at a speed of the order of 750 revolutions per minute. Connected to the end of the driving shaft of motor 32 is a cam member 33. The piston 28 is attached by means of a screw 34 to a piston rod 35 supported by a flexible flat strap 36 of Phosphor bronze which, as shown in Fig. 3, extends over a roller 37 and terminates in a fixed connection on the drum 38.

Figure 3:
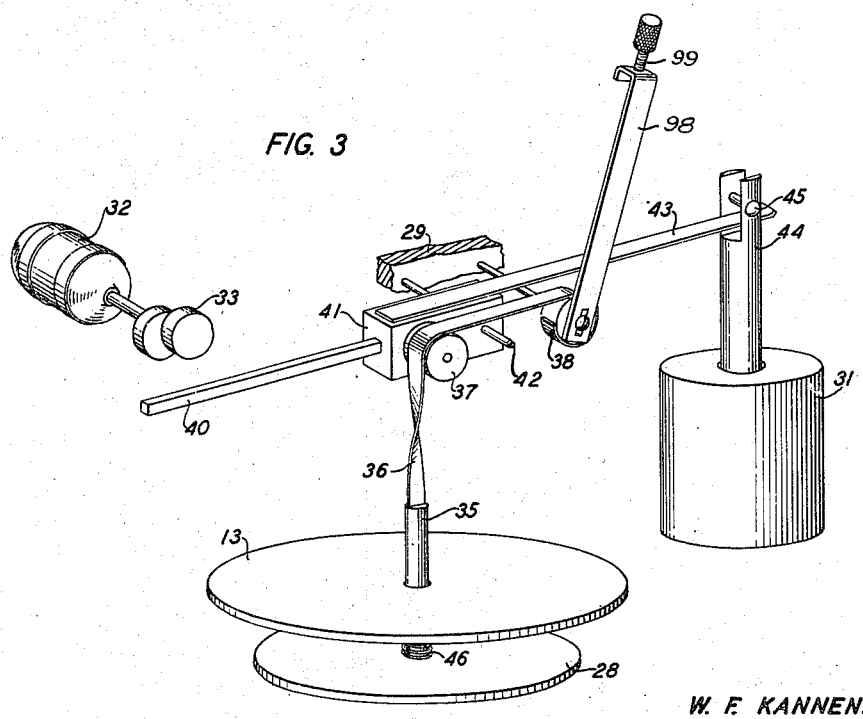
Fig. 3 illustrates in perspective the fundamental parts of the reciprocating drive mechanism of the tuner of Fig. 1.

A lever system, best shown in Fig. 3, comprises a rigid rectangular metallic rod 40 projecting into a block 41 which is pivotally mounted on the frame 29 by means of the pivot rod 42. Block 41 has attached thereto at its upper surface a long leaf spring member 43, the end of which projects through a slot in the plunger 44 of solenoid 31 beneath a shackle pin 45. In the unenergized condition of solenoid 31 the piston rod 35 is drawn inwardly under the influence of helical spring 46 surrounding the piston rod 35 and extending between the tuning disc 28 and the interior surface of the cover 13. The position of the piston rod 35 is limited in a downward direction by the leaf spring 43, the outer end of which bears against pin 45. In this extreme position of the tuning piston 28 rod 40 is entirely disengaged from cam 33, the interior volume of the resonance chamber is at a minimum and its resonance frequency is so much higher than any frequency which transmitter 1 may have that the resonance chamber does not respond to the pulses received by pick-up element 8 from transmitter 1. Accordingly, the action of the spring 46 is to maintain the test equipment at such a different frequency than the oscillations of the transmitted pulses that it is effectively disconnected from the transmitter. Upon closure of the key 47 in series with the source 48 and solenoid 31, the solenoid attracts its plunger 44 downwardly to rock lever system 43, 41, 40 about its pivot 42 to bring the rod 40 into contact with the cam 33 as is illustrated in Fig. 1. Thereafter as long as the solenoid remains energized and the rod 40 is in contact with the cam 33 the cam will serve to cyclically depress the rod by swinging the lever system about its pivot 42 against the flexing resistance of the spring 43 thus causing the roller 37 to correspondingly fall and rise and so oscillating the piston tuner 28 in a vertical direction. The apparatus is preferably so designed that the range of resonance frequencies of chamber 1 extending from that corresponding to the lower position of the tuner piston 28 to that corresponding to the high position includes the entire gamut of frequencies through which transmitter 1 may possibly be varied. In order to shift the band of frequencies of the resonance chamber the revoluble drum 38 is provided with an attached adjusting arm 98 carrying at its upper end a set-screw 99 by which it may be locked in position at any points on the periphery 50 of an arcuate extension of an upstanding side wall 51. It will be apparent that rotation of the arm 98 in a counterclockwise direction will lower the central position of the tuner piston 28 and rotation to the right will conversely wind up the flexible strip 36 about the drum 38 and raise the central position of the tuner piston. Moreover, this adjustment of the central position may be made while the tuning apparatus is being oscillated by the action of cam 33 on the rod 40.

If the object locator apparatus of Fig. 1 is installed on an aircraft the testing equipment may be mounted on the same aircraft with the pick-up antenna 8 in position to receive energy from the antenna 3 of the object locator transmitter. In its normal inactive condition the test equipment is so far detuned from the test pulses of the object locator transmitter that it will be effectively insensitive to them. Accordingly, when the object locator is put into operation the test equipment in no way affects it. When it is desired to use the test equipment to check the performance of the object locator the operator closes the circuit of the solenoid 31 and simultaneously closes the circuit of the motor 32. For this purpose solenoid 31 and motor 32 may be connected in the same circuit. Operation of the solenoid 31 brings the tuning of the chamber 12 to a frequency in the neighborhood of that of the transmitter and operation of the motor 32 serves through cam 33 and the lever system 40, 41, 42, 43 to cyclically vary the resonance frequency of the resonance chamber 12 through a band which includes the frequency of transmitter 1. At some point in its cycle a natural resonance frequency of the resonator 12 will agree with the frequency of the transmitter 1 and the pulse of oscillations sent out from transmitter antenna 3 will be picked up by element 8 and caused to build up a strong electromagnetic field within the chamber 12. Simultaneously the outgoing pulse from transmitter 1 causes TR box 4 to desensitize receiver 2. Although relatively insensitive to received energy, the receiver, nevertheless, indicates the pulse as at I on the screen of oscilloscope 5 since the energy of the pulse is so very high. Upon cessation of the pulse at the beginning of the interval T the strong electromagnetic field which has been built up by resonance within the resonance chamber 12 delivers energy to the pick-up element 8 from which it is radiated outwardly to simulate a reflected pulse. This energy received by antenna 3 is impressed through the TR box 4 upon the receiver 2 and is indicated as a reflected pulse RI. The receiver 2 which had been desensitized during transmission of the high energy pulse quickly regains its normal sensitivity. Returned energy continues to cause an indication of the cathode ray oscilloscope 5 until, as it rapidly falls away at the end of the period T, the trace disappears in that of the noise N. The period T measured from the termination of the initial high power pulse to the time when the reflected impulse effectively disappears is known as the "ring time" of resonance chamber 12. It may be increased by enhancement of any factor which has to do with the quantity of energy returned by the test equipment to the receiver 2. Among these factors are the power and the wave shape of the initially transmitted pulse. The transmission factor of the transmitting antenna and its associated circuits and likewise of the test antenna 8 and its associated coaxial circuit 10 are important. Any adjustment of this equipment which augments the amount of transmitted energy or of that returned increases the "ring time" T. Of very great importance is the resonance persistence or Q of the resonance chamber 12 and the coupling of the loop 11 with the electromagnetic field of the resonance chamber. In order to make the "ring time" as long as possible, or what leads to the same result, to increase the effectiveness of the test equipment it is desirable to reduce the transmission loss in the coaxial line 10 as far as possible. This consideration leads to placing the pick-up element in a position where it is exposed to the transmitter field and placing the resonance chamber 12 in a position close to its pick-up element 8 and hence in the nose portion of the airplane or whatever part carries the radiator 3 of the object locator. It is for that reason that a remote control of the test equipment is desirable.

The resonance persistence or Q of the resonance chamber 12 may also be increased by increasing the conductivity of its interior surface as, for example, by a coating or plating 27 of silver on the interior surface of the piston and of the cylindrical wall and the end wall opposite the piston. The chamber 12 and the piston may consist of brass, copper, aluminum or any other good electrical conducting material or of any good structural material which will serve as a supporting medium of adequate rigidity and strength where the material is provided with a coating of electrically conducting material of high conductivity on the interior surface of the chamber and piston.

The apparatus may also be used on the ground or elsewhere as a simple wave meter. For this purpose, the cylindrical extension 23 may be pressed upwardly and locked in position by the wing nut 26 thus bringing the coupler 15 into the interior field space of chamber 12. The tuner piston 28 may then be manually manipulated until a maximum response is noted on the direct current meter 20 and the frequency determined by any suitable calibration of the position of the tuner equipment.

What is claimed is:

1. A testing system for an electromagnetic echo object locator comprising a resonator having a substantially closed cylindrical conducting chamber adapted for resonance to high frequency electromagnetic oscillations, one end of said chamber being movable, a motor-driven means for producing an eccentric motion, a support, lever means pivotally mounted upon said support and connected to said chamber end, said lever engaging said eccentric motion-producing means for translating said eccentric motion into a reciprocating motion of said end to periodically vary the resonance frequency of the chamber, and remotely controlled means to effectively disengage said lever from said eccentric motion-producing means at will and to simultaneously shift said end to such a position that the natural resonance frequency of the chamber falls outside the range through which the resonance frequency may be periodically varied.

2. A testing system for an electromagnetic echo object locator comprising a resonator having a substantially closed cylindrical conducting chamber adapted for resonance to high frequency electromagnetic oscillations, one end of said chamber being movable, a motor-driven means for producing an eccentric motion, a support, lever means pivotally mounted upon said support and connected to said chamber end, said lever engaging said eccentric motion-producing means for translating said eccentric motion into a reciprocating motion of said end to periodically vary the resonance frequency of the chamber, and solenoid means to disengage said lever from said eccentric motion-producing means when the degree of energization of said solenoid is changed and to simultaneously shift said end to such a position that the natural resonance frequency of the chamber falls outside the range through which the resonance frequency may be periodically varied.

3. A testing system for an echo object locator of the type which transmits periodic pulses of electromagnetic energy subject to possible variation within a range of frequencies between a first frequency and a second frequency, said testing system comprising a resonator having a resonance chamber, an input circuit coupled to said resonator for supplying electromagnetic energy from said transmitted pulses to said resonance chamber, said resonator having a tuning plunger means adapted to tune the natural resonance frequency of said resonator to electromagnetic energy over a frequency range greater than the range between said first and second frequencies, a motor-driven means for producing an eccentric motion, a support, lever means pivotally mounted upon said support at one point and connected to said plunger means at a second point, said lever engaging said eccentric motion producing means at a third point for translating said eccentric motion into a reciprocating motion of said plunger means, the length of said lever from said one point to said second point being proportioned with respect to the length of said lever from said one point to said third point to reciprocate said plunger means over a sweep between a position whereat said resonator is tuned by said plunger means to said first frequency and a position whereat said resonator is tuned by said plunger means to said second frequency, and remotely controlled means connected to said lever to effectively disengage said lever from said eccentric motion producing means at will and to simultaneously shift said plunger means to a position outside said reciprocating sweep.

WALTER F. KANNENBERG.
JOHN P. KINZER.
CHARLES W. SCHRAMM.
IRA G. WILSON.

REFERENCES CITED

The following references are of record in the file of this patent:

UNITED STATES PATENTS

| Number | Name | Date |
| --- | --- | --- |
| 2,106,776 | Trevor et al. | Feb. 1, 1938 |
| 2,119,567 | Williams | June 7, 1938 |
| 2,218,223 | Usselman et al. | Oct. 15, 1940 |
| 2,218,923 | Newhouse | Oct. 22, 1940 |
| 2,304,186 | Litton | Dec. 8, 1942 |
| 2,306,282 | Samuel | Dec. 22, 1942 |
| 2,323,201 | Carter | June 29, 1943 |
| 2,356,414 | Linder | Aug. 22, 1944 |
| 2,405,277 | Thompson | Aug. 6, 1946 |
| 2,407,847 | Peterson | Sept. 17, 1946 |
| 2,426,177 | Carlson | Aug. 26, 1947 |
| 2,460,827 | Isely | Feb. 8, 1949 |